US005771145A

United States Patent [19]

Seymour et al.

[11] Patent Number: 5,771,145

[45] Date of Patent: Jun. 23, 1998

[54] ZERO CURRENT CIRCUIT INTERRUPTION

[75] Inventors: Raymond K. Seymour, Plainville; Paul H. Singer, West Hartford; David Arnold, Chester, all of Conn.

[73] Assignee: General Electric Company, New York, N.Y.

[21] Appl. No.: 767,747

[22] Filed: Dec. 17, 1996

[51] Int. Cl.$^{6}$ .......... H02H 3/00

[52] U.S. Cl. .......... 361/93; 361/87; 361/102; 335/19

[58] Field of Search .......... 361/93–97, 102, 361/87; 335/18, 19

[56] References Cited

U.S. PATENT DOCUMENTS

| | | | |
|---|---|---|---|
| 3,693,122 | 9/1972 | Willard | 335/174 |
| 4,281,303 | 7/1981 | Heft | 335/16 |
| 4,301,489 | 11/1981 | Stich | 361/9 |
| 4,583,146 | 4/1986 | Howell | 361/13 |
| 4,645,889 | 2/1987 | Howell | 200/144 AP |
| 4,672,501 | 6/1987 | Bilac et al. | 361/96 |
| 5,453,724 | 9/1995 | Seymour et al. | 335/172 |
| 5,563,459 | 10/1996 | Kurosawa et al. | 307/141.4 |
| 5,566,041 | 10/1996 | Rumfield | 361/115 |

*Primary Examiner*—Brian K. Young
*Assistant Examiner*—Michael J. Sherry
*Attorney, Agent, or Firm*—Richard A. Menelly; Carl B. Horton

[57] ABSTRACT

Each pole of a multi-pole circuit breaker is equipped to individually separate the circuit breaker contacts within each pole upon overcurrent occurrence. A digital processor within the circuit breaker trip unit determines the occurrence of zero current crossing of phase current within the individual poles and initiates contact separation at zero current values.

9 Claims, 3 Drawing Sheets

ZERO CURRENT CIRCUIT INTERRUPTION

BACKGROUND OF THE INVENTION

The use of microprocessor-controlled circuit breaker electronic trip units such as described in U.S. Pat. No. 4,672,501 entitled "Circuit Breaker and Protective Relay" allows accurate determination of the current within each phase of a multi-phase electrical distribution network.

The ability to switch between tap settings on a tap changer voltage regulator without incurring arcs is described within U.S. Pat. No. 4,301,489 entitled "Arcless Tap Changer Utilizing Static Switching".

A circuit breaker having individual operating mechanisms within each pole of a multi-pole circuit breaker to separately interrupt the individual phase circuits is described in U.S. Pat. No. 4,281,303 entitled "Individual Circuit Breaker Pole Trip Mechanism". This patent teaches that the increased speed with which the individual poles can be opened separately upon overcurrent occurrence allows the circuit breaker contacts to be separated in the early stages of the current waveform to reduce the let-through current during the interruption process.

More recent examples of zero current circuit interruption are found in U.S. Pat. No. 5,563,459 entitled "Apparatus of Controlling Opening and Closing Timings of a Switching Device in an Electric Power System" and U.S. Pat. No. 5,566,041 entitled "Zero-Sequence Opening of Power Distribution".

In state-of-the-art circuit breakers, the contacts controlling the pole in which the fault occurs usually separate at the time that the current approaches zero thereby driving the remaining poles into so-called "single phasing" status until the remaining contacts become separated, usually at much higher currents. The occurrence of such high current circuit interruption requires large current carrying components to prevent overheating and arc chambers that are sized to quench the arcing current that occurs upon contact separation as well as to provide a high dielectric resistance to the arc voltages.

It has since been determined that selectively separating the contacts within the individual poles to allow the associated current phases to interrupt close to the zero crossing of the current waveform reduces the component size requirements along with the size of the associated circuit breaker arc chutes.

One purpose of the invention is to provide a circuit breaker employing an electronic trip unit with individually-separable circuit breaker contacts in order to separate the circuit breaker contacts within each phase of a multi-phase electric distribution circuit at the lowest current value.

SUMMARY OF THE INVENTION

Each pole of a multi-pole circuit breaker is equipped to individually separate the circuit breaker contacts upon overcurrent occurrence. A digital processor within the circuit breaker trip unit determines the occurrence of zero current crossing of the associated phase current within the individual pole and initiates contact separation at the lowest possible current value.

DESCRIPTION OF THE PREFERRED EMBODIMENT

Figure 1:
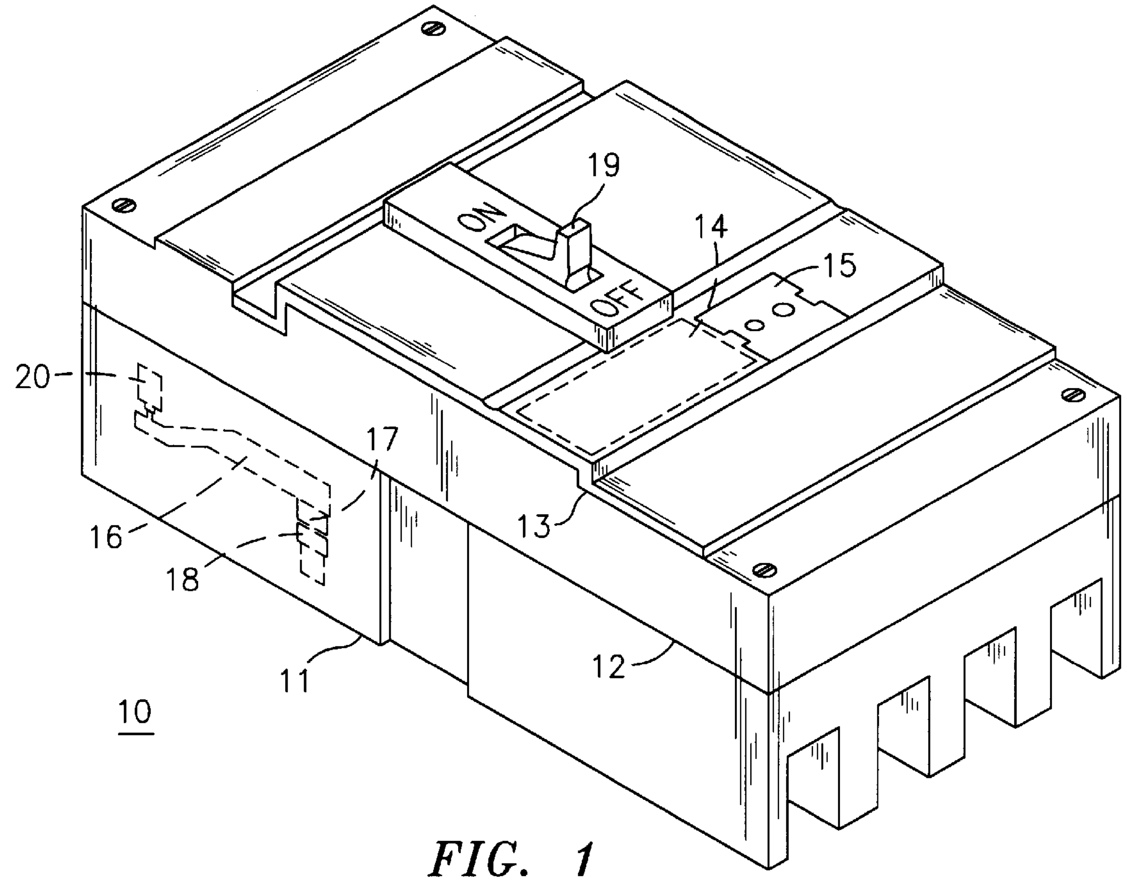
FIG. 1 is a top perspective view of a circuit breaker employing individual contact separation devices in accordance with the teachings of the invention.

The multi-pole industrial-rated circuit breaker 10 shown in FIG. 1 comprises a molded plastic case 11, molded plastic cover 12 and an accessory cover 13. The circuit breaker includes an electronic trip unit 14 and rating plug 15 similar to those contained within the aforementioned U.S. Pat. No. 4,672,501. A movable contact arm 16 containing the movable contact 17 at one end is provided within each pole of the circuit breaker to separate the movable contact from a fixed contact 18 to interrupt circuit current upon occurrence of an overcorrect condition by operation of a flux shifter unit 20 controlled by the electronic trip unit 14. An externally-accessible operating handle 19 interconnects with each of the contact arms to allow simultaneous opening and closing of the contact arms under quiescent circuit conditions.

Figure 2:
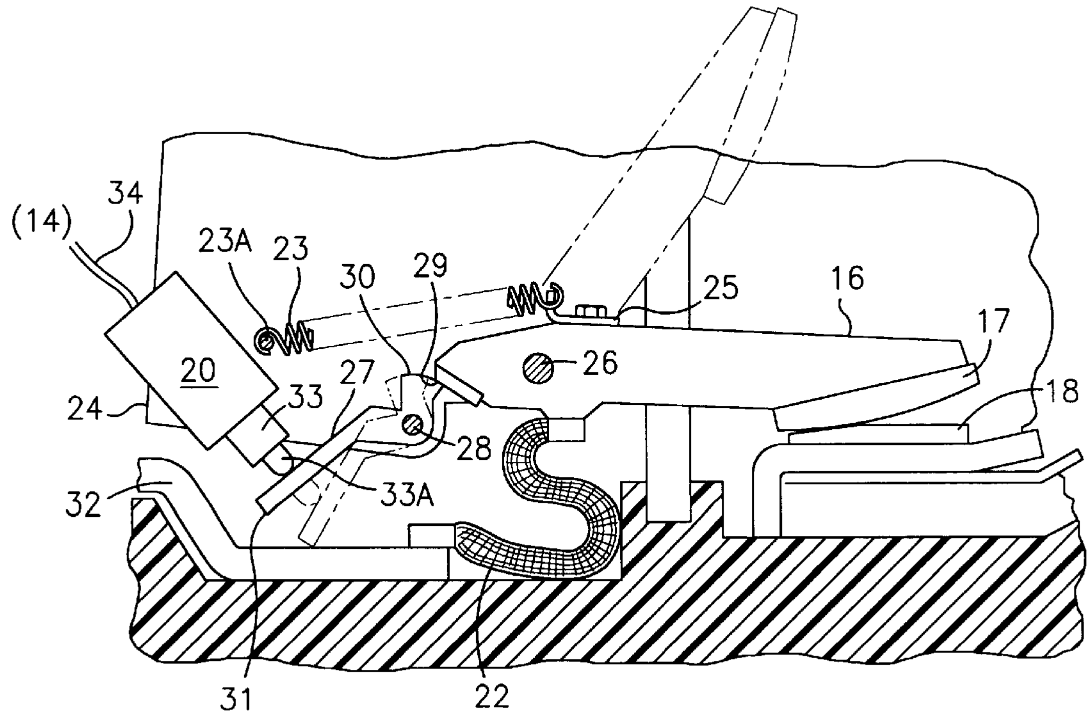
FIG. 2 is an enlarged side view in partial section of the contact separation device in one pole within the circuit breaker of FIG. 1.

A part of the circuit breaker 10, shown in FIG. 2, depicts the flux shifter 20 which operates to separate the movable and fixed contacts 17, 18 in accordance with the teachings of the invention. The flux shifter 20 is similar to that described in U.S. Pat. Nos. 3,693,122 and 5,453,724 and includes a spring-driven plunger 33 having a button 33A at the end thereof. Each contact arm 16 within the separate poles electrically connects with a load strap conductor 32 by means of a conductive braid 22. The contact arm 16 interacts with a corresponding flux shifter 20 which electrically connect with the electronic trip unit 14 of FIG. 1 by means of the electrical conductors 34. In a manner similar to that described in the aforementioned U.S. Pat. No. 4,281,303, the contact arm 16 is restrained from moving to the tripped position indicated in phantom against the bias provided by the extended operating spring 23 by means of a latching lever 27. The operating spring 23 is attached to a side wall 24 within the circuit breaker 10 by means of a pin 23A at one end and to the end of the contact arm 16 by means of a bolt as indicated at 25. The contact arm is pivotally attached to the sidewall 24 by means of the pivot pin 26 for operating between the closed condition indicated in solid lines, with the contacts 17,18 in abutment, to the tripped position depicted in phantom with the contacts 17,18 completely separated. The latching lever 27 defines a camming surface 30 at one end which is held against a cam 29 formed on the end of the contact arm 16 to prevent the rapid rotation of the contact arm 16 into the tripped position under the urgence of the powerful operating spring 23. When an overcurrent condition is sensed within a protected electrical distribution system that contains the circuit breaker 10 of FIG. 1, the electronic trip unit 14 then determines the time of occurrence of zero current waveform within the phase associated with the respective contact arm 16 and sends a trip voltage signal to the flux shifter 20. Upon receipt of the trip voltage signal over conductors 34, the flux shifter 20 releases the plunger 33 thereby driving the button 33A against the latch arm 31 rotating the latch arm about the pivot pin 28 to move the camming surface 30 away from the cam 29. The contact arm 16 immediately rotates about the pivot pin 26 to the tripped position indicated in phantom under the urgence of the extended spring 23 to thereby separate the contacts 17,18 with minimum current transfer through the contacts at the instant of separation. The circuit current through the adjoining poles is next processed by the electronic trip unit 14 of FIG. 1 to send trip voltage signals to the respective flux shifters upon occurrence of zero current waveform within the respective poles. To close the circuit breaker contacts simultaneously within the respective poles upon clearance of the fault, the circuit breaker handle 19 motivates the circuit breaker crossbar (not shown) in the manner described within the aforementioned U.S. Pat. No. 4,281,303. In some applications, it is desired to open the individual poles upon occurrence of a zero voltage waveform across the circuit breaker contacts 17, 18, as suggested within aforementioned U.S. Pat. No. 5,563,459. In that event, the electronic trip unit 14 then selects the resetting of the individual flux shifter units 20 within each of the poles to allow the respective contacts 17, 18 to close upon occurrence of zero voltage waveform within the respective poles.

Figures 3A, 3B, 3C, 4A, 4B, 4C:
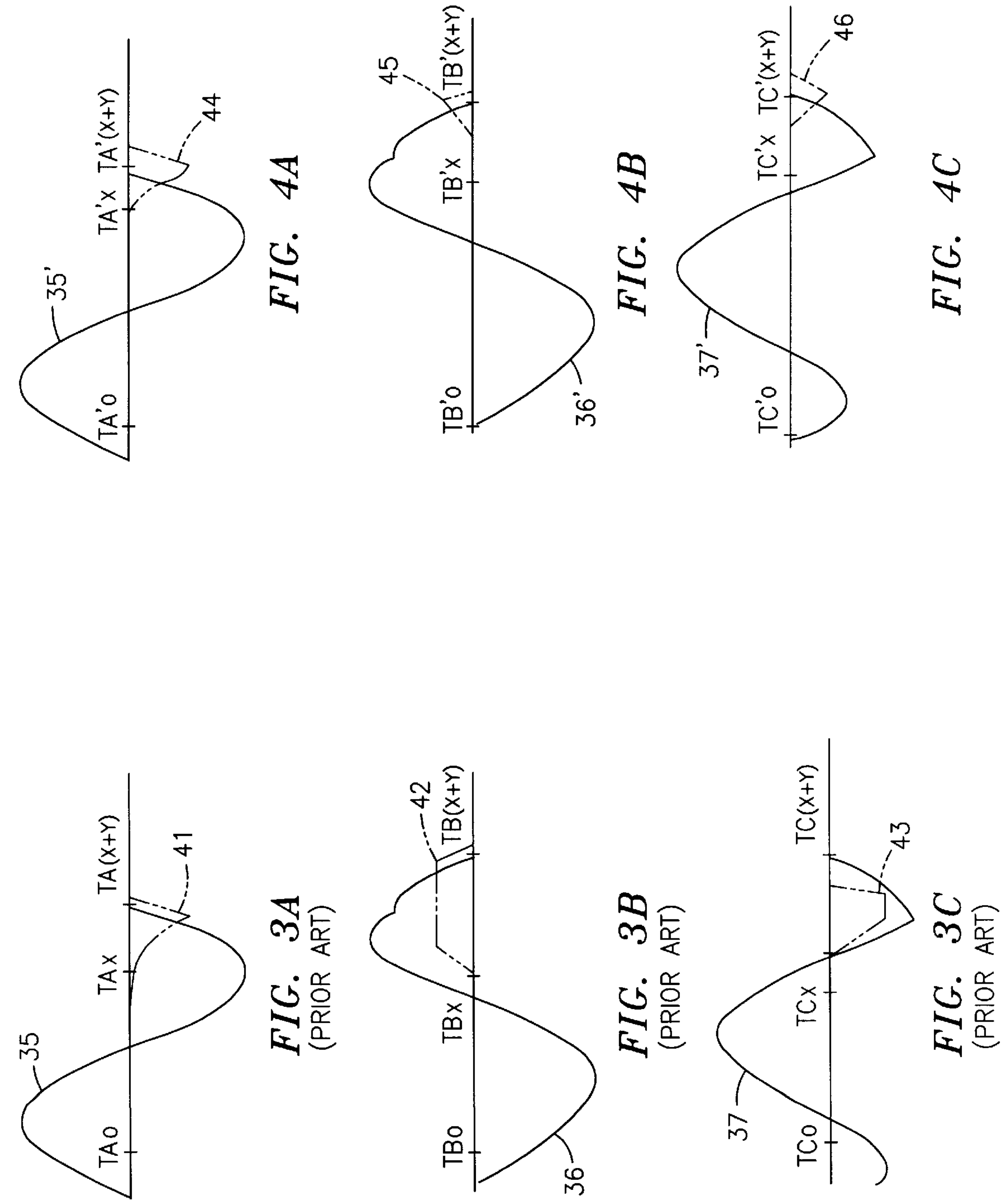
FIG. 3A (PRIOR ART)
FIG. 3B (PRIOR ART)
FIG. 3C (PRIOR ART)
FIGS. 3A–3C are graphic representations of the current waveforms within each pole of a circuit breaker according to the Prior Art during circuit interruption.
FIG. 4A–4C are graphic representations of the current waveforms within each pole of the circuit breaker of FIG. 1 during circuit interruption according to the Invention.

To better understand the concept of zero current transfer, it is helpful to review the occurrence of circuit interruption within circuit breakers currently employed within three phase power distribution systems, as depicted in FIGS. 3A–3C.

In FIG. 3A, the phase A current waveform 35 in the first pole of a standard three pole circuit breaker, goes into an overcurrent condition as indicated at TAo, at which time the circuit breaker releases the contact operating mechanism to separate the circuit breaker contacts to interrupt the circuit current in all three phases, A, B, C. The inherent delay x in the mechanism causes the contacts in the first pole to separate as indicated at TAx, at which time an arc occurs across the first pole contacts for a y period of time. The arc voltage waveform is depicted in phantom at 41. The associated arc chamber then extinguishes the arc as indicated at TA(x+y) to completely interrupt the current in the first pole. The energy dissipated in the arc chamber is proportional to the integration product of the arc current, the arc voltage and the time.

In FIG. 3B, the operating mechanism begins to interrupt the phase B current waveform 36 in the second pole as indicated at TBo. The mechanism causes the second pole contacts to separate as indicated at TBx, at which time an arc occurs across the second pole contacts for a y period of time. The arc voltage waveform is depicted in phantom at 42. The associated arc chamber then extinguishes the arc as indicated at TB(x+y) to completely interrupt the current in the second pole. It is noted that the integration of the arc voltage and current results in a larger energy dissipation in this pole than shown earlier for the first pole in FIG. 3A.

In FIG. 3C, the operating mechanism begins to interrupt the phase C current waveform 37 in the third pole as indicated at TCo. The mechanism causes the third pole contacts to separate as indicated at TCx, at which time an arc occurs across the third pole contacts for a y period of time. The arc voltage waveform is depicted in phantom at 43. The associated arc chamber then extinguishes the arc as indicated at TC(x+y) to completely interrupt the current in the third pole. The integration of the arc voltage and current results in a greater energy dissipation in this pole than shown earlier for the first pole in FIG. 3A and less than that for the second pole shown in FIG. 3B.

The following FIGS. 4A–C depict the three phase circuit interruption that occurs when the current in all three phases is controlled for contact separation at zero current in all three phases.

In FIG. 4A, the phase A current waveform 35' in the first pole, goes into an overcurrent condition as indicated at TA'o, at which time the circuit breaker trip unit actuates the associated flux shifter to separate the circuit breaker contacts to interrupt the circuit current in all three phases, A, B, C at zero current. The contacts in the first pole separate as indicated at TA'x, at which time a slight arc occurs across the first pole contacts for a y period of time. The arc voltage waveform is depicted in phantom at 44. The associated arc chamber then extinguishes the arc as indicated at TA'(x+y) to completely interrupt the current in the first pole. As described earlier, the energy dissipated within the associated arc chamber is the integration of the arc voltage and current for the period of time that the arc exists prior to extinction and results in a predetermined low arc energy value.

As depicted in FIGS. 4B and 4C, the current in the remaining poles, B, C "single phase" during the time that the arc current occurs in phase A. The associated contacts in the B and C poles remain closed until the electronic trip unit determines that the currents in the B and C phases are near zero. The electronic trip unit then actuates the associated flux shifter units to separate the contacts at zero current therein.

In FIG. 4B, the operating mechanism begins to interrupt the phase B current waveform 36' in the second pole as indicated at TB'o. The mechanism causes the second pole contacts to separate just prior to zero current, as indicated at TB'x, at which time an arc occurs across the second pole contacts for a y period of time and the arc voltage waveform is depicted in phantom at 45. The associated arc chamber then extinguishes the arc as indicated at TB'(x+y) to completely interrupt the current in the second pole.

In FIG. 4C, the operating mechanism begins to interrupt the phase C current waveform 37' in the third pole as indicated at TC'o. The mechanism causes the third pole contacts to separate just prior to zero current, as indicated at TC'x, at which time an arc occurs across the third pole contacts for a y period of time and the arc voltage waveform is depicted in phantom at 46. The associated arc chamber then extinguishes the arc as indicated at TC'(x+y) to completely interrupt the current in the third pole. The associated arc chambers in the B and C poles simultaneously interrupt the B and C phase "single phase" currents that are equal and opposite in magnitude.

Comparing FIGS. 3A–C to 4A–C shows that substantially reduced energy dissipation can be attained by allowing the actual contact separation to occur as close to zero current as possible. The limit of the arc energy accordingly allows a corresponding reduction in the size and nature of the arc chute required to dissipate the arc energy. The calibration of the time required for the contacts to separate upon energizing the flux shifter units 20 (FIG. 2) then allows the electronic trip unit to precisely control the contact separation to close to zero current.

The low arcing voltage and arc duration could allow the use of varistor arc quenching as suggested in U.S. Pat. No. 4,583,146 entitled "Fault Current Interrupter" and U.S. Pat. No. 4,645,889 entitled "Varistor Quenched Arc Chute for Current Limiting Circuit Interrupters".

Figure 5:
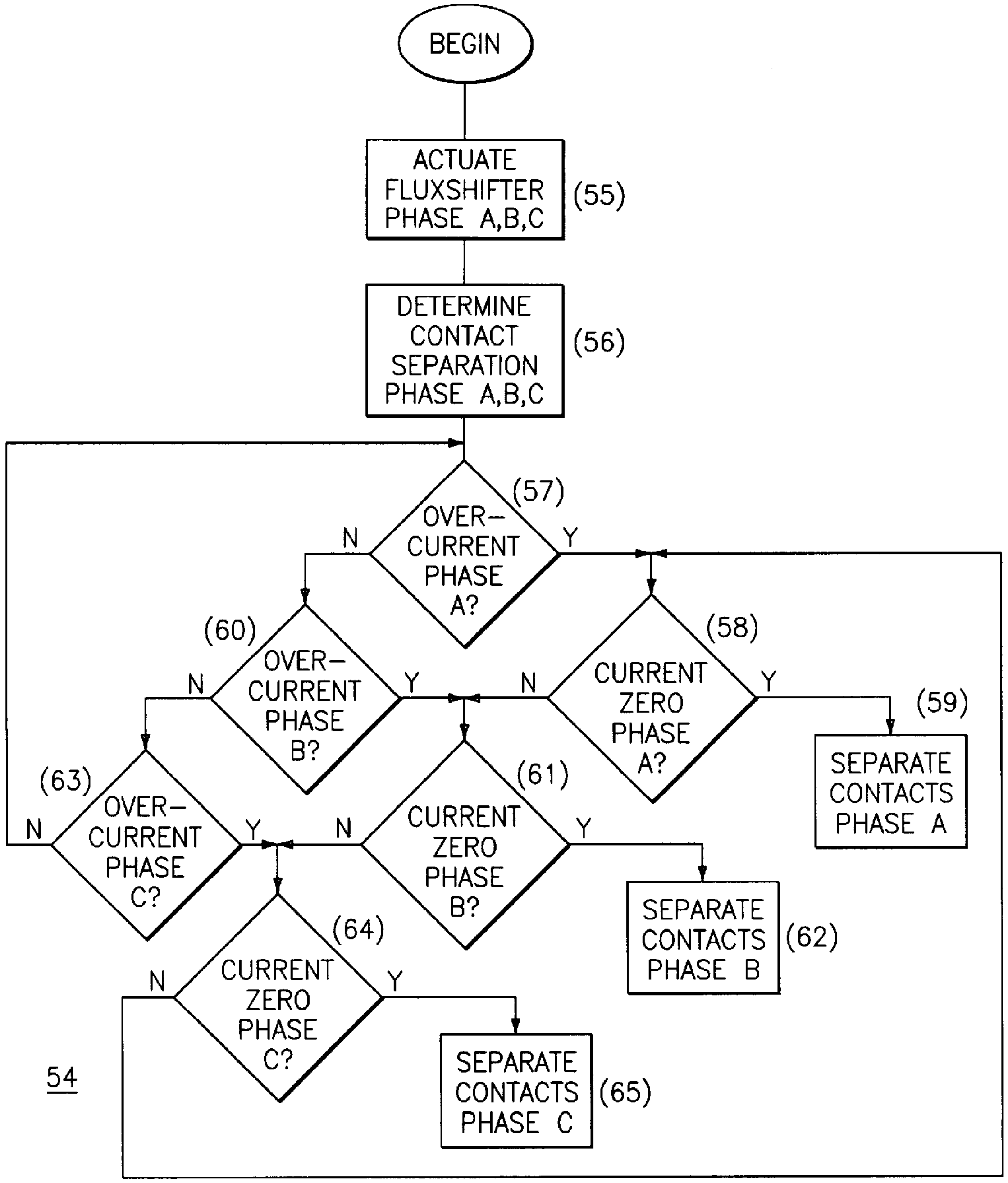
FIG. 5 is a flow chart representation of steps involved in providing zero current circuit interruption according to the invention.

When the interruption time for each of the contacts 17, 18 (FIG. 2) within the individual phases A, B, C is determined by the flow chart 54 depicted in FIG. 5, the contacts within each phase can then be separated at zero current within each phase upon overcurrent occurrence within any one of the phases. The interruption of each phase at current zero provides an even greater reduction in the amount of energy to be handled by the contacts than described early for zero current separation for two out of the three phases.

The flow chart 54 of FIG. 5 is performed within the electronic trip unit 14 of FIG. 1 in the following manner. In the calibration mode, the flux shifter within the individual phases are actuated (55) and the response time for the associated contacts to separate is determined (56) in order to precisely control the actual separation time. The tolerances of the flux shifters, operating springs and the contacts set the contact separation parameters and such tolerances accordingly are reflected in the time the phase shifter is actuated to result in contact separation at an exact time thereafter. After calibration, the trip unit then continuously samples the current in each phase (57, 60, 63) and if an overcurrent is detected in any one pole, a determination is made whether the current in any pole is at current zero (58, 61, 64) and the contacts are separated within each pole at current zero (59, 62, 65).

A three phase fault has been considered with respect to the interruption depicted in FIGS. 4A–4C. However, should a single phase, phase to phase or phase to ground fault occur, a similar interruption sequence also occurs.

The effect of opening all poles at current zero when any one of the poles experiences an overcurrent is a substantial advancement in circuit protection devices that require silver material on the contact surfaces to protect the contacts from arc erosion and large metal plates within the arc chambers to cool and quench high energy arcs.

A circuit breaker has herein been described having contact separation potential within each pole to open the individual poles at zero current. Substantial reduction in the amount of let-through current and arc energy is thereby realized.

We claim:

1. A circuit interrupter comprising:

a cover attached to a case;

a contact arm within said case within each separate pole of a multipole electrical connector, said contact arm defining a camming surface on one end thereof;

a contact on an end of said contact arm opposite from said camming surface arranged for connection within each pole of said multipole electrical connector;

an operating spring interacting with said contact arm for rotating said contact arm and said contact to an open position;

a pivotal lever interacting with said contact arm camming surface for preventing said contact arm from rotating to said open position;

a flux shifter unit within each pole and interacting with said pivotal lever for releasing said camming surface and allowing rotation of said contact arm and said contact to said open position to interrupt current flow through said contact; and an electronic trip unit connecting with said separating means for actuating said separating means to release said latching means.

2. The circuit interrupter of claim 1 wherein said operating spring extends from said one end of said contact arm to a fixed point within circuit breaker case.

3. The circuit interrupter of claim 2 wherein said one end of said camming surface clears said camming surface when said contacts are in an open position.

4. A method of interrupting circuit current in a multiphase electrical distribution system comprising the steps of:

connecting a pair of separable contacts within each phase of a multi-phase electric circuit;

providing means within each phase of of a multi-phase electric circuit for separating each pair of said contacts upon command; connecting means within each phase of said electric circuit for determining occurrence of an overcurrent condition within one phase of of a multiphase electric circuit; factoring a time of response to separate said contacts upon occurrence of a zero current; and, separating a pair of said contacts within a particular phase upon occurrence of a zero current within said particular phase.

5. The method of claim 4 including the step of determining a time of response for said separating means to separate said contacts after receiving said command.

6. The method of claim 5 including the step of factoring said time of response to separate said contacts upon occurrence of a zero current.

7. A method of interrupting circuit current in a multiphase electrical distribution system comprising the steps of:

connecting a pair of separable contacts within each phase of a multi-phase electric circuit;

providing means within each phase of a multi-phase electric circuit for separating each pair of said contacts upon command;

determining occurrence of an overcurrent condition within one phase of a multi-phase electric circuit; and separating a pair of said contacts within each phase upon occurrence of a zero current within each phase.

8. A method of interrupting circuit current in a multiphase electrical distribution system comprising the step of:

connecting a multi-pole circuit interrupter within each phase of a multi-phase electric circuit, said circuit interrupter comprising an insulative cover attached to an insulative case, a contact arm within said case within separate poles of a multipole electrical connector, a contact on one end of said contact arm arranged for connection within each pole of said multipole electrical connector, an operating spring interacting with said contact arm for rotating said contact arm and said contact to an open position, latching means interacting with said contact arm for preventing said contact arm from rotating to said open position, separating means within each pole for releasing said latching means and allowing rotation of said contact arm and said contact to said open position to interrupt current flow through said contact;

determining occurrence of an overcurrent condition within one phase of a multi-phase electric circuit; and separating said contact within said one phase upon occurrence of a zero current within said one phase.

9. A method of interrupting circuit current in a multiphase electrical distribution system comprising the steps of:

connecting a multi-pole circuit interrupter within each phase of a multi-phase electric circuit, said circuit interrupter comprising an insulative cover attached to an insulative case, a contact arm within said case within separate poles of a multipole electrical connector, a contact on one end of said contact arm arranged for connection within each pole of said multipole electrical connector, an of operating spring interacting with said contact arm for rotating said contact arm and said contact to an open position, latching means interacting with said contact arm for preventing said contact arm from rotating to said open position, separating means within each pole for releasing said latching means and allowing rotation of said contact arm and said contact to said open position to interrupt current flow through said contact;

determining occurrence of an overcurrent condition within one phase of a multi-phase electric circuit; and separating each contact within each phase upon occurrence of a zero current within each phase.

* * * * *